Dec. 29, 1942.    J. O. AICHER    2,306,925
ELECTRODE AND IT'S FABRICATION
Filed April 22, 1942    2 Sheets-Sheet 1
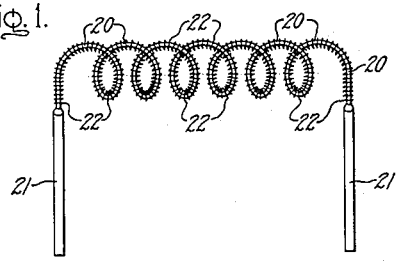
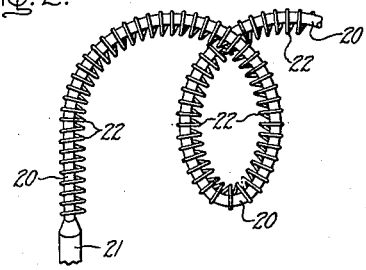
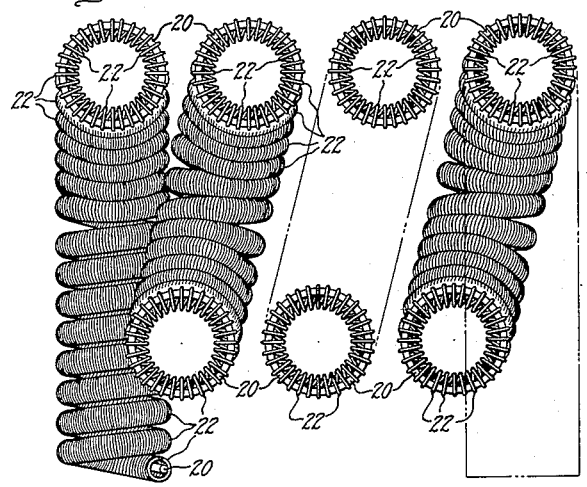
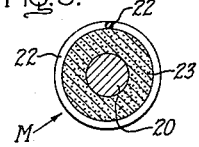
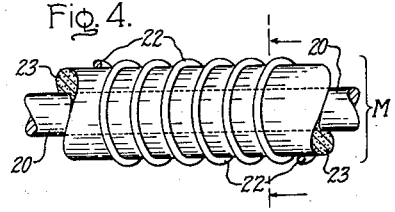
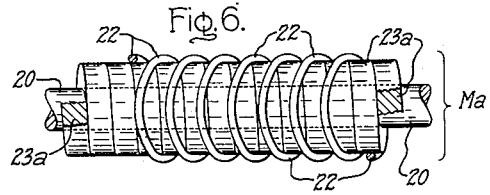
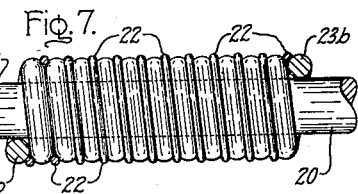
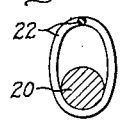
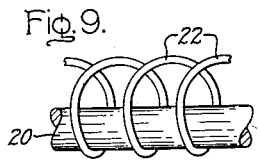
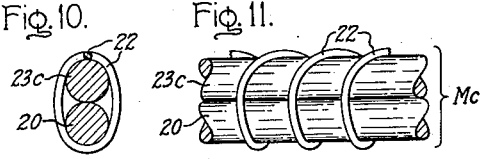
Inventor:
John O. Aicher,
by John H. Anderson
His Attorney.

Dec. 29, 1942.   J. O. AICHER   2,306,925
ELECTRODE AND IT'S FABRICATION
Filed April 22, 1942   2 Sheets-Sheet 2
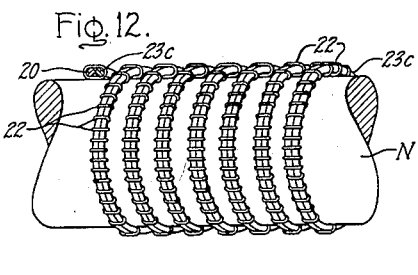
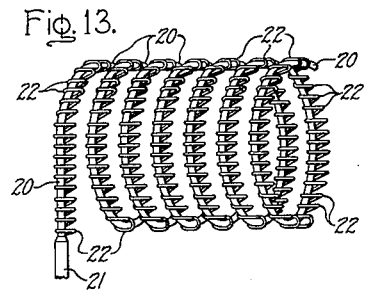
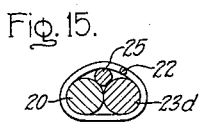
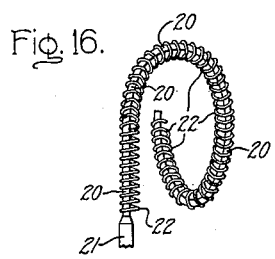
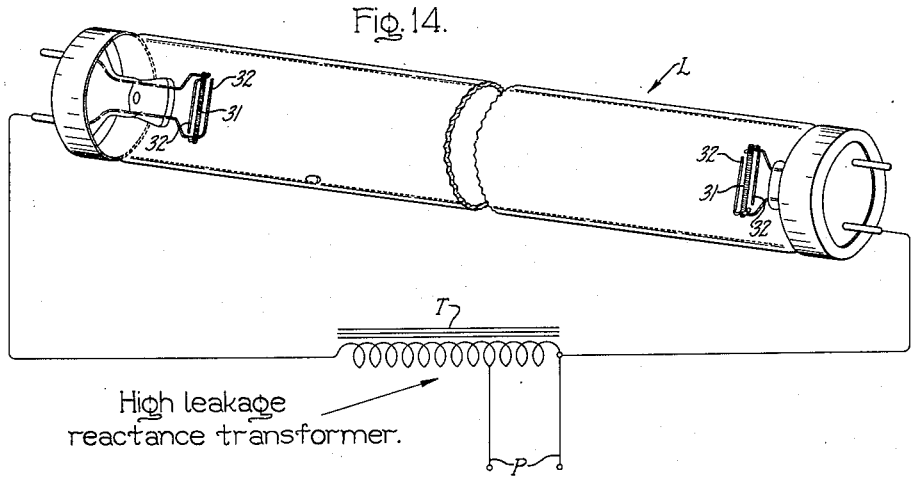
High leakage reactance transformer.
Inventor:
John O. Aicher,
by John H. Anderson
His Attorney.

Patented Dec. 29, 1942

2,306,925

UNITED STATES PATENT OFFICE 2,306,925

ELECTRODE AND ITS FABRICATION

John O. Aicher, Cleveland Heights, Ohio, assignor to General Electric Company, a corporation of New York Application April 22, 1942, Serial No. 440,077

22 Claims. (Cl. 250—27.5)

This invention relates to electrodes for electric discharge devices, and to the construction and fabrication of such electrodes, especially cathodes. The invention is very advantageous for fluorescent lamps or tubes of the usual low pressure positive column discharge type, and is hereinafter explained with special reference to its use in such lamps. Through the invention, a new type of cathode for such discharge lamps has been evolved, which gives the lamps a useful life of thousands of hours and thousands of cold starts without appreciable blackening of the tube wall, yet is also adaptable to the usual method of hot-starting now in general use. More broadly, my novel method of fabrication is adaptable and highly advantageous for the manufacture of a general type of electrode structure that has heretofore only been possible for discharge devices of higher wattages than the common type of commercial fluorescent lamps, including lamps of relatively high pressure during operation. This application is a continuation-in-part of my application Serial No. 404,541, filed July 29, 1941, assigned to the assignee of this application.

The requirements for cathodes of fluorescent tubes are somewhat contradictory, and difficulty has been experienced in reconciling the contradictions. On the one hand, it is desirable that the cathode should heat up and become fully emissive very quickly, which has suggested a construction consisting of fine refractory metal wire compactly coiled, as into a "triple coil," and coated or impregnated with refractory electron-emissive material. On the other hand, it is desirable that the active cathode surface should all be at potentials within a restricted range during operation,—if not at substantially the same potential,—which would require a more massive structure to afford high conductivity. If, moreover, the cathode is very thin, as in a coil of fine wire, the spot where the electric discharge or arc strikes may become locally overheated, and may even get so hot that emissive material on the cathode coil vaporizes and deposits on the nearby wall of the lamp tube. Difficulty has also been experienced in making the cathode hold and retain a sufficient amount of activating material or oxide.

One cathode construction that has been proposed consists of a coil of wire having suitable resistance and current-carrying capacity to give no more than the permissible or desirable voltage drop, with an overwinding of finer wire to provide additional surface and interstices for holding emissive material: In other words, a coiled coil of fine wire with the mandrel wire on which the first and smaller coil is wound left in place in this small coil, when and after the latter is wound into a larger coil, to serve as a current conductor in the completed tube or lamp. It has even been proposed to coil up this whole coil into a larger coil, thus making a coiled coil of the larger wire, and a triple coil of the finer wire. Such constructions, however, have proved to be subject to the drawback of not heating up quickly enough; furthermore, it is difficult to get a sufficient amount of activating material to adhere to such a cathode, or to remain in intimate contact with the metal.

Another form of cathode construction, represented by U. S. Patent 2,009,211 to St. Louis and U. S. Patent 2,232,780 to Foulke, consists of fine wire which is first wound on a comparatively large mandrel wire and is then removed and slipped on a smaller conductor wire as a loose overwind providing interstitial spaces for activating material around the conductor wire. The conductor wire with this loose overwind may be bent into a loop or wound up into a helical coil. However, this mode of construction is only suitable for lamps of higher wattage or current than ordinary fluorescent lamps, and cannot be made commercially in the small dimensions and wire sizes required for fluorescent lamps of ordinary types and wattages. Nor is it feasible to fabricate in this manner an electrode in which the conductor wire forms a double coil and the finer "overwind" wire a triple coil, as in preferred forms of cathode hereinafter described.

In electrodes according to my invention, the contradictory requirements above indicated may be reconciled, and the drawbacks of prior constructions overcome, while the fabrication of the structure is facilitated by the novel method which I have devised, and which is also applicable to electrodes other than that of my present invention.

In my cathode construction, there may be employed a coil of tungsten or other metal wire (whether round, or of angular or flattened cross-section, like a strip or ribbon) which may be of a size suitable for rapid heating and easy starting. With this may be associated a conductor which is larger in cross-section, and engages various convolutions or turns of the finer wire at isolated points. The contacts of the conductor wire with the finer electrode wire generally afford adequate electrical connection; but the wires may, if desired, be suitably attached to one another, as by spot-welding. The conductor wire may be considerably larger than the fine wire, so as to afford ample strength and carry current easily to the convolutions of the fine wire, and to receive heat from portions that tend to overheat and redistribute it to other portions,—thus equalizing and keeping down the temperature of the active portion of the cathode sufficiently to prevent objectionable heat effects on its emissive material. But while the other electrode wire may surround the conductor wire like an overwind, yet the conductor is considerably smaller than the internal opening of the overwind coil, and engages any coil convolution at no more than one place, so that it does not interfere with rapid heating of the smaller wire. The major portions of its convolutions, at least, lie so far away from the conductor that heat is not too readily transmitted to the conductor through the heavy coating of refractory (and thermo-insulative) electron-emissive oxide(s) that is accommodated and securely retained within the fine wire convolutions. With the coil of finer wire and its associated conductor coiled up into a larger coil, a very satisfactory cathode is provided, characterized by low resistance and easy starting. If desired, this recoiling may be repeated one or more times: I. e., a coiled coil in accordance with my invention may include a coil of fine wire and an associated larger wire which are together coiled up or recoiled once or any desired number of times.

In one preferred form of my electrodes, each convolution of fine wire overwind comprises bends of the relatively fine wire connected by straighter portions, thus constituting an oval or elongated loop—or even a polygon (preferably a triangle) with rounded corners. Thus the bends of fine wire lie even further from the conductor than if the convolutions were circular and of the same length or internal perimeter as the oval or polygonal convolutions.

Tungsten, molybdenum, or an alloy or composite of these answers very well as the metal for the associated conductor and overwind wires of my electrode, though any other suitable metal(s) may be used, such as tantalum, platinum, nickel, iron, or alloys of any of these metals with various others.

In fabricating an electrode in accordance with my invention, the electrode overwind wire may be wound on a composite mandrel comprising in its cross-section segregated materials of different characters, one of which provides the main electrode wire or conductor above referred to, while the other serves as auxiliary material or filler for increasing its effective size. In such a composite mandrel, the filler may be associated with the main conductor in a great variety of ways. For example, it may be applied as a coating of more or less uniform thickness all around the main wire, or as "padding" (so to speak) along one side of the main wire or along opposite sides thereof, or may even be wound around it or twisted with it more or less helically, or braided with it in a plait. If desired, the composite mandrel with its overwind may be rewound into a larger coil on a suitable (primary) mandrel, and this rewinding may be repeated on another (secondary) mandrel, etc., one or more times, so as to form the main electrode wire into a coil, a coiled coil, or a triple coil, etc. Subsequently, the filler material and any mandrel(s) used may be removed or eliminated in any suitable way, thus leaving the convolutions of the overwind coil only partially filled with the main wire, and forming a more or less "loose" overwind around the latter. In cathodes thus made, it is found that the major part of the overwind convolutions are in contact with the main conductor wire—or, at least, a sufficient number of them to afford ample connections, without any necessity for welding the convolutions to the other wire.

The mode of application of the filler material to the main electrode wire will naturally depend somewhat on its character and on its condition when applied. If it is a lacquer, varnish, or bitumen rendered fluid by means of a solvent, or a bitumen, enamel, or plastic like "Bakelite" softened or rendered fluid by heat, or a vulcanizable rubber composition, the main electrode wire may run continuously through a bath of this softened or liquid filler material maintained at suitable consistency to produce a coating of the desired thickness when the speed of movement of the wire is correspondingly regulated, and may then, if found necessary, pass through a die opening acting as a "doctor" to remove any excess of coating material. While substantial or approximate linear uniformity of the filler along the wire is desirable, the cross-section of the coated wire need not be circular. Of course the coated wire may be subjected to any required treatment to harden the filler material properly, as by passing it through a cooling, drying, baking, curing, or vulcanizing zone or oven. The filler material should be hard and tough enough to sustain the cutting, crushing, and squeezing tendency of the fine overwind wire when it is being wound on the composite mandrel rapidly under the necessary tension, and must sustain any bending or treatment used in fabricating the electrode without breaking or losing its needful strength; yet it must be removable without injury to the electrode wires when itself no longer needed. Accordingly, the selection of a suitable filler depends very largely on the electrode metal(s) used, as well as on whether the composite mandrel and its overwind undergo further coiling—as may usually be the case. These exacting requirements can commonly be met by using filler material(s) similar to the mandrel(s) used for coiling the main electrode wire, such as metal(s) different from the metal(s) of the electrode wires. For electrode metal(s) that require to be set by heat after coiling, filler metal that remains solid and resistant under this setting heat is advisable; and for refractory electrode metal(s), refractory filler metal(s) are generally indicated. When electrode wires of tungsten are used, molybdenum is very suitable for the filler.

Removal of the filler material may in some instances be effected by mechanical manipulation that results in withdrawing it from association with the main electrode wire and the overwind wire after the latter has been wound on. When this proves impracticable or impossible, as in cases where the filler must remain in place until the composite mandrel with the overwind has undergone one or more coilings, removal can be effected by disintegrating the filler, as by melting or vaporizing it away at temperatures that do not materially affect the electrode metal(s), or by burning or other disintegrating chemical attack with suitable reagents.

When metal is used as the auxiliary filler material, it may be applied to the main electrode wire or associated with it in various ways, as by drawing the wire continuously through an electroplating apparatus and bath, or through a bath of molten metal. Another way of coating electrode wire with filler metal is to fit a bar of the electrode metal into a tube of the filler metal, and then roll, swage, and draw this composite ingot into a composite mandrel wire containing a core of electrode wire of the desired gauge. With a core of tungsten, molybdenum is particularly suitable as the filler metal, being but little more ductile than tungsten, so that the two can be worked down and reduced in size together almost pari passu. Or the auxiliary filler metal may itself be used in the form of wire, which may be of round, angular, or flattened cross-section. In this case, the main electrodes wire may be covered or virtually coated with the filler metal by winding the auxiliary filler wire around the main electrode wire in convolutions that touch one another, or lie suitably close together, and in any suitable number of layers. This offers the possibility of producing a composite mandrel "screw-threaded" with helical "grooves" in which the overwind electrode wire may be wound to determine the pitch and internal diameter of the overwind after removal of the filler. By selecting the size of the auxiliary wire, the pitch or spacing of its convolutions, the number of wires used in each convolution and the resulting character of the "screw-threads" (single, double, triple, etc.), the number of layers of filler wire, and the number of wires used in the overwind, extreme variety of overwind convolution spacings and diameters is available. The shape of the overwind convolutions may be determined by the cross-section of the main electrode wire(s).

In some instances, winding(s) of filler wire on the main electrode wire may be removed by unwinding between the convolutions of overwind electrode wire, which may be elastically sprung aside sufficiently to permit this. This method of removal offers the advantage that the filler wire can be of the same metal as the electrode wires, or of other metal that is amenable to the same disintegrating treatments or reagents as the electrode wires.

In fabricating an electrode in accordance with my invention by the employment of auxiliary filler wire, the latter may most simply be used as longitudinal "padding" extending alongside the main electrode wire (as above mentioned), either straight or twisted around or with the main wire, or even braided with the latter. If desired, the auxiliary wire extending alongside the main wire may be laterally hollowed to conform to the latter, as by making the auxiliary wire of crescent-shaped cross-section—though in general a circular auxiliary wire answers the purpose very well. Accordingly, the fine wire that forms the overwind may be wound on a composite mandrel consisting of the main conductor wire or rod above referred to together with one or more associated auxiliary wires or rods, arranged side by side, and of different metals, one of which (as well as the fine wire) is not attacked by a reagent or solvent to which the other is amenable: E. g., if the finer wire and the conductor wire or rod are of tungsten, the auxiliary wire(s) or rod(s) may be of molybdenum. The composite mandrel with its winding may then be rewound into a larger coil on a suitable mandrel wire or rod, and, if desired, this rewinding may be repeated one or more times. Subsequently, the mandrel and auxiliary wire(s) may be chemically attacked and eliminated or removed by means of any suitable solvent or reagent that does not affect the finer wire and the conductor wire.

Other features and advantages of the invention will become apparent from the following description of species and forms of embodiment, and from the drawings.

In the drawings,

Fig. 1 is a general side view of a coiled cathode constructed according to the invention, and Fig. 2 is a fragmentary side view of part of this device, on a larger scale, while Fig. 3 is a side view, partly sectional, and partly in dot-and-dash outline, of a cathode of coiled-coil type.

Fig. 4 is a fragmentary tilted side view illustrating an early stage in the fabrication of a cathode according to my general method; Fig. 5 is a cross-sectional view taken as indicated by the line and arrows 5—5 in Fig. 4; and Figs. 6 and 7 are fragmentary tilted side views similar to Fig. 4 illustrating variations of the same general method.

Figs. 8 and 9 are cross-sectional and side views illustrating a cathode structure with an "overwind" coil of elongated loop-like or elliptical convolutions, and Figs. 10 and 11 are similar views illustrating an early stage in the fabrication of such a cathode structure.

Fig. 12 illustrates the fabrication of a coiled cathode structure with elongated overwind convolutions, and Fig. 13 is a fragmentary side view of the resulting structure.

Fig. 14 is a tilted side view of a positive column electric discharge tube, such as a fluorescent lamp tube, equipped with cathodes fabricated according to my invention, a mid-portion of the tube being broken out and omitted to permit the drawings to be made on a larger scale, and suitable circuit connections for the device being diagrammatically shown.

Fig. 15 is a cross-sectional view similar to Fig. 8 showing an overwind of somewhat triangular convolutions, and Fig. 16 is a fragmentary view similar to a portion of Fig. 13 illustrating a coil with an overwind of triangular convolutions.

As shown in Figs. 1 and 2, the cathode structure comprises a coil of the main electrode or conductor wire 20 connected to lead-wire supports 21, 21 and having thereon an overwind of electrode wire 22, preferably finer than the conductor wire 20, and forming a coiled coil. The overwind 22 may be connected to the lead-wire supports 21, 21 directly, as well as through the main conductor wire 20. As shown in Fig. 3, the main wire 20 is coiled again so as to form a coiled coil, while the overwind 22 forms a triple coil. To avoid confusion, the activating material is omitted from these figures.

Figs. 4 and 5 illustrate the first stages in one method of producing either the Figs. 1 and 2 structure or the Fig. 3 structure. As here shown, the main electrode wire 20 has been enclosed in an even layer of filler metal 23, and on the composite mandrel M thus formed the overwind 22 has been wound. One way of applying or coating the filler metal 23 on the main electrode wire 20 is by electroplating. For a main conductor or electrode wire 20 of tungsten, the filler metal may be molybdenum. If, as is usually the case, a sufficient length of the main wire 20 is used to make coiling thereof advisable, the composite mandrel M with its overwind 22 may be worked up into a final form corresponding to Figs. 1 and 2 or to Fig. 3 (or into any other desired form) and "set," if necessary, in any usual or suitable way, after which the filler material may be removed, as well as any other mandrel(s) employed. For example, the composite mandrel M with its overwind 22 may be wound on a (primary) mandrel wire of molybdenum (not shown), preferably of larger gauge than the wire 20, and this combination may be wound on another (secondary) molybdenum mandrel, after which the congeries of coils may be set by heating to about 1500° C. in hydrogen, and the filler material 23 and any mandrel(s) used may all be dissolved out with the usual molybdenum solvent of nitric and sulphuric acids. This leaves the coil or coiled coil of main wire with its overwind 23 ready for mounting on the lead wire supports 21, 21 as in Fig. 1, and for coating or charging with activating material or oxide(s).

Figs. 6 and 7 illustrate another way in which a main electrode wire 20 may be covered or coated with filler metal. For this purpose, a wire of the filler metal is wound on the main electrode wire 20 with adjacent convolutions touching, or nearly so, and the overwind wire 22 is wound on the resulting composite mandrel.

If, as shown in Fig. 6, a filler wire 23a of rectangular cross-section is wound with its turns touching or close enough together, the resulting mandrel Ma is plain and even-surfaced like that shown in Figs. 4 and 5, so that the wire 22 can be wound thereon with any pitch desired, without regard to that of the winding 23a.

If, however, the turns of filler wire are spaced apart sufficiently, or are of suitable non-rectangular cross-section,—e. g., a circular wire 23b as shown in Fig. 7,—then the resulting mandrel Mb has helical grooves which may seat the turns of the overwind 22 and determine their pitch. By choosing the cross-section and/or number of layers of the filler-wire 23a or 23b appropriately, the coil size and pitch of the overwind 22 can be made anything desired. In either case, the composite mandrel Ma or Mb with its overwind 22 may be worked up into any desired final form substantially as already described in connection with Figs. 4 and 5. For the method illustrated in Figs. 6 and 7, electrode wires 20 and 22 of tungsten may be used with filler and mandrel wires of molybdenum.

For the convenience of those wishing to practice my invention, I will now give illustrative particulars for making a cathode suitable for an ordinary 48 inch, 40 watt fluorescent tube of 1½ inch diameter, according to the method more particularly illustrated in Fig. 7 and just explained,—though this illustration is not to be understood as limiting or defining the invention:

In preparing the composite mandrel Mb, a round filler wire 23b of 1½ mil molybdenum may be wound 530 turns per inch on a round conductor wire 20 of 2.33 mil tungsten. In the grooves formed by the adjacent molybdenum convolutions, a round wire 22 of 0.7 mil tungsten may be wound 530 turns per inch, at a pitch of 270 per cent. The winding of the molybdenum filler wire 23b and the tungsten overwind 22 may be carried on concurrently from suitable spools mounted adjacent one another on the head of the winding machine, in such relation that the tungsten is wound a few turns behind the molybdenum. In the primary cathode coiling, the composite mandrel Mb with its tungsten overwind 22 may be wound 115 turns per inch at a pitch of 135 per cent on a round mandrel wire (not shown) of 11.5 mil molybdenum; and in the secondary coiling, this aggregate may be wound 25 turns per inch at a pitch of 125 per cent on a round mandrel-wire of 24.1 mil molybdenum. Each cathode may comprise 9½ turns of this final coiling, with short straight lengths of the primary coil extending from its ends to be welded to the lead support 21, 21, as shown in Figs. 1 and 2, the overwind of 0.7 mil tungsten being included in these welds. After suitable heat treatment to set the coils and elimination of all the molybdenum wires by means of suitable solvent, the cathode is ready for its coating of activating material, which may be applied, etc., in the usual manner. A fluorescent lamp with such cathodes may be operated hot-starting in the usual way, or may be operated cold-starting with the circuit connections illustrated in Fig. 14 and described hereinafter.

As shown in Figs. 8 and 9, the wire 22 is formed into an elongated or oval coil,—using the word "oval" in a broad sense as applicable to any loop-like coil comprising bends connected by straighter portions,—and the wire 20 is round, preferably circular. As here shown, the wire 20 extends through the coil of wire 22, and its thickness is of the same order as the internal dimensions of the coil: E. g., the diameter of the wire 20 may be half the greater internal dimension of the coil 22, or less, and approximately equal to the smaller internal dimension of this coil, or less.

It will be seen from Figs. 8 and 9 that practically the entire surface of the wire 22 that forms the more active portion of the cathode is available and sufficiently exposed for coating with activating electron-emissive material, such as various well-known refractory oxides, which may also come in contact with the base or conductor-wire 20 at the points of engagement between the two wires, or even coat the wire 20 completely. Moreover, the spacing of the wire 22 from the wire 20 provides space for the activating material and recesses favorable to its retention. The conductor wire 20 engages the convolutions or turns of the coiled wire 22 at a series of isolated points or places of linear contact which provide adequate current and heat-transmitting connections for the convolutions; and the wire 20 is everywhere close enough to the wire 22 to absorb heat radiated from overheated portions of the wire 22 and redistribute it by radiation to other portions, as well as by conduction. At the same time, the wire 22 can become hot enough without there being excessive electrical resistance in the cathode; while the particular point where the arc strikes can be as hot as is desirable without overheating objectionably.

Figs. 10 and 11 illustrate the fabrication of such an electrode by a method in which a filler or auxiliary wire 23c is used as longitudinal padding alongside the main conductor wire 20 to form a composite mandrel Mc on which relatively fine overwind wire 22 is wound. As here shown, the wire 22 is first wound (rather tautly) on the composite mandrel Mc consisting of associated longitudinal strands or wires, one being the conductor wire 20 and the other the auxiliary or filler wire 23c, arranged side by side, forming a series of elongated or oval convolutions, Figs. 8–11, each comprising bends of the fine wire connected by straighter portions,—a bend of each convolution conforming to the conductor wire 20 therein. The wires 20 and 23c are of different metals,—one not affected by a reagent or solvent that does attack the other: E. g., if the wire 20 is of tungsten, the wire 23c may be of molybdenum. The composite mandrel Mc with its winding 22 is then wound up into a larger coil on a suitable mandrel N as shown in Fig. 12. After suitable heat treatment to set the tungsten wire in coiled configuration, the auxiliary wire 23c may be dissolved out by means of any suitable solvent therefor which does not affect the metal of the wires 20, 23c materially. The mandrel N may be removed either by withdrawing it from the coil before or after this solvent treatment, or by dissolving it out at the same time as the mandrel 23c, if it is of molybdenum or other suitable metal. In either case, the coil structure as shown in Fig. 13 is left, requiring only to be welded to the lead 21. Or, if desired, the mandrel N with its winding of wires 20, 23c, and 22 may be wound helically on another larger mandrel (not shown) before dissolving out the molybdenum wires and welding to the lead wires. Coating of the wire 22 (and also the wire 20, if desired) with activating material, if such activation is needed, leaves the cathode ready for mounting in the lamp.

The following examples illustrate appropriate proportions and details of procedure, but are not to be understood as defining or limiting the invention:

For the composite mandrel Mc may be used round wires 20, 23c of 2 mil tungsten and 2½ mil molybdenum. The wire 22 coiled on this mandrel may be a round 0.65 mil tungsten wire. The composite mandrel Mc with its winding of 0.65 mil tungsten wire may be coiled on a round mandrel N of 6 mil molybdenum wire,—and if desired, this aggregate might in turn be wound on a round mandrel of 20 mil molybdenum wire (not shown). After suitable heat treatment to set the 0.65 mil and 2 mil tungsten wires in their coiled configuration, all the molybdenum wires may be dissolved out with ordinary molybdenum solvent, comprising nitric and sulphuric acids in suitable proportions. The ends of the coiled coil of 2 mil tungsten conductor wire 20 may then be welded to the lead supports 21, 21, as shown in Figs. 1, 2 and 13, the coiled coil of 0.65 mil tungsten wire 22 being included in these welds, and thus also attached to the conductor wire 20. With the wire 22 coiled 400 turns per inch on the composite mandrel 20, 23c, with this composite mandrel and its overwind coiled 115 turns per inch on the 6 mil mandrel, and with this aggregate coiled 44 turns per inch on the 20 mil mandrel, 13¼ turns of the final coiling (plus short straight lengths of the primary coil for welding to the leads 21, 21) are suitable for each cathode of an ordinary 18 inch 15 watt fluorescent lamp of 1 inch tube diameter, to be operated either hot-start or cold-start. The wire 22 need not be welded to the wire 20 at intermediate points, the mere contact of the convolutions being relied on for sufficiently distributed electrical connections. The 2 mil wire 20 carries the current and imparts mechanical strength, while the 0.65 mil wire 22 forms the more active cathode surface. The cathode is now ready for its coating of activating material, which may be applied, etc., in the usual manner.

In a similar manner, cathodes suitable for an ordinary 48 inch 40 watt fluorescent tube of 1½ inch diameter may be fabricated with round wires 20, 23c of 2.35 mil tungsten and 3.5 mil molybdenum for the composite mandrel Mc. On this mandrel Mc may be wound a round wire 22 of 0.7 mil tungsten at 530 turns per inch. This composite mandrel Mc with its winding of 0.7 mil tungsten wire may then be wound on a round mandrel of 10.0 mil molybdenum wire at 104 turns per inch. This aggregate may in turn be wound on a round mandrel of 24 mil molybdenum at 32.2 turns per inch. After setting of the tungsten and elimination of all the molybdenum wires, 9.5 turns of the final coil (made on the 24 mil molybdenum mandrel) may be used for each cathode, with short additional lengths of the primary coil extending from the ends of the final coil for welding to the lead supports 21, 21 as shown in Figs. 1, 2, and 13. With these cathodes, such a lamp L may be operated hot-starting in the usual way, or may be operated cold-starting with the circuit connections illustrated in Fig. 14, where the cathodes 31, 31 with their associated auxiliary anodes 32, 32 are shown connected across the secondary of a step-up high leakage-reactance autotransformer T whose primary is connected across the A. C. power-supply circuit P. When properly selected, such a transformer T connected in this manner gives a sufficiently high open-circuit voltage for starting the discharge, and a suitably lower operating voltage when discharge current is drawn from it after starting. Thus operated, such lamps may give a useful life of thousands of hours, including as many as 5000 cold starts, before appreciable blackening occurs.

It will be seen from Figs. 12 and 13 that taut winding of the fine wire 22 on a composite mandrel Mc consisting of two adjacent round longitudinal wires 20, 23c naturally results in the long cross-sectional dimension of the resulting aggregate lying parallel with the axis of the larger mandrel N when this aggregate is wound on the mandrel N: I. e., the mandrel wires 20, 23c wind side by side against the mandrel N, so that the longer dimension or diameter of the oval coil of fine wire 22 lies parallel with the axis of the larger coil as shown in Fig. 13. This is not so favorable an arrangement of the oval coil for electrode purposes (especially in the case of an activated cathode) as if the longer dimension of the oval of fine wire 22 extended radially of the mandrel N and of the coil formed thereon, or approximately so. However, a very favorable disposition of the small coil of fine wire 22 can be secured by associating with the (tungsten) conductor wire 22 in the composite mandrel two auxiliary longitudinal (molybdenum) wires 23d, 25, the wire 23d of about the same size as the wire 20, and the wire 25 substantially smaller, as shown in Fig. 15, so that the convolutions of the fine wire 22 tautly wound on these wires 20 and 23c, 25 shall be approximately polygonal: i. e., a triangle with rounded corners,— corresponding corners of each convolution conforming to the wire therein. When such a triangular aggregate is wound on a larger mandrel N with the conductor wire 20 and the wire 23c side by side directly against the mandrel N, the ultimate result will be a coil such as indicated in Fig. 16, with fine wire bends projecting more or less radially outward from the larger coil, as well as parallel with its axis.

While I have described a preferred form of construction and method of fabrication for this type of my cathode, it will be evident to those skilled in the art that the same permits of variations, either of form or of method. For example, the wires 20, 22 might be of the other tungsten metal, molybdenum, instead of tungsten itself, or of any other suitable metal, refractory or otherwise; the conductor wire 20 might be either larger or smaller than shown relative to the internal openings of the convolutions of the coil 22; and the wire 22 might be larger or smaller than shown relative to the wire 20, so long as the latter has adequate current carrying capacity to supply the convolutions of the wire 22 without objectionable differences in potential amongst them. If desired, the wire 22 might be spot-welded to the wire 20 at some or all of their places of contact. The composite mandrel indicated in Fig. 15 might comprise more than one or two auxiliary wires 23d, 25; or there might be several of the conductor wires 20. The longitudinal wires 20, 23d that extend side by side to form the composite mandrel might also be twisted together somewhat. The shape of cross-section of any of the wires used might be varied: E. g., the wires 20 and 23d might together form a complete and truly circular mandrel on which to wind the wire 22.

What I claim as new and desire to secure by Letters Patent of the United States is:

1. A method for electrode fabrication which comprises winding relatively fine wire on a composite mandrel comprising in its cross-section segregated materials of different character, and subsequently eliminating one of the said mandrel materials, so that the remaining mandrel material only partially fills the convolutions of relatively fine wire.

2. A method for electrode fabrication which comprises winding relatively fine wire on a composite mandrel comprising in its cross-section segregated materials of different character, winding the resulting coil and mandrel on another mandrel, and subsequently eliminating one of the materials of the first-mentioned mandrel, so that the remaining material of said first-mentioned mandrel only partially fills the coil of relatively fine wire, also removing the other mandrel.

3. A method for electrode fabrication which comprises winding relatively fine electrode wire on a composite mandrel of other electrode wire and associated filler material, and removing the filler material, thus leaving the relatively fine wire as a loose overwind around said other wire.

4. A method for electrode fabrication which comprises winding relatively fine electrode wire on a composite mandrel comprising other electrode wire and associated filler material that is solid and resistant under a temperature that sets the electrode wires, winding the composite mandrel with its fine wire winding around other mandrel means also solid and resistant under said temperature, heating and setting the electrode wires, disintegrating and removing the filler material, and also removing the other mandrel means.

5. A method for electrode fabrication which comprises substantially covering electrode wire with filler material, thus forming a composite mandrel larger than said electrode wire, winding relatively fine electrode wire on this composite mandrel, and removing the filler material, thus leaving the relatively fine wire as a loose overwind around the other electrode wire.

6. A method for electrode fabrication which comprises winding relatively fine refractory electrode wire on a composite mandrel of other refractory electrode wire and associated refractory filler metal, heating and setting the refractory wire, and removing the refractory filler metal, thus leaving the relatively fine wire as a loose overwind around said other electrode wire.

7. A method for electrode fabrication which comprises winding relatively fine electrode wire on a composite mandrel of other electrode wire and associated filler metal, winding the composite mandrel with its fine wire winding around another mandrel, and winding this around yet other mandrel means, heating and setting the electrode wires, and disintegrating and removing the filler metal and the other mandrel means employed.

8. A method for electrode fabrication which comprises coating longitudinal refractory wire with refractory filler metal to form a composite mandrel larger than said longitudinal wire, winding relatively fine refractory wire on this composite mandrel, heating and setting the refractory wire, and disintegrating and removing the refractory filler metal, thus leaving the relatively fine wire as a loose overwind around said longitudinal refractory wire.

9. A method for electrode fabrication which comprises winding relatively fine refractory electrode wire on a composite mandrel of refractory electrode wire covered with refractory filler metal, winding the composite mandrel with its fine wire winding around other refractory mandrel means, heating and setting the electrode wires, disintegrating and removing the filler metal, and also removing the other mandrel means employed.

10. A method for electrode fabrication which comprises associating electrode wire and filler wire to form a composite mandrel larger than said electrode wire, winding relatively fine electrode wire on this composite mandrel, and removing the filler wire, thus leaving the relatively fine wire as a loose overwind around the first-mentioned electrode wire.

11. A method for electrode fabrication which comprises winding filler wire around longitudinal electrode wire to form a grooved composite mandrel of larger effective size than said longitudinal wire, winding relatively fine electrode wire in the grooves of said mandrel, and removing the filler wire, thus leaving the relatively fine wire as a loose overwind around said longitudinal wire.

12. A method for electrode fabrication which comprises associating longitudinal electrode and filler wires side by side as a composite mandrel of larger effective size than said electrode wire, winding relatively fine electrode wire on said mandrel, and removing the filler wire, thus leaving the coil of relatively fine wire as a loose overwind around said longitudinal wire.

13. A method for electrode fabrication which comprises winding relatively fine wire on a composite mandrel comprising associated longitudinal wires of different metals; chemically attacking and eliminating a longitudinal mandrel wire; and attaching the fine wire to a remaining mandrel wire.

14. A method for electrode fabrication which comprises tautly winding relatively fine wire on a composite mandrel comprising associated longitudinal round wires of different metals, thus forming convolutions each comprising bends of the fine wire connected by straighter portions; winding the composite mandrel with its fine wire winding around another mandrel, with adjacent mandrel wires of different metals side by side against said other mandrel; and subsequently chemically attacking and thus removing the wound mandrel wire of one metal, and also removing the aforesaid other mandrel.

15. A method for electrode fabrication which comprises winding relatively fine wire on a composite mandrel comprising a pair of longitudinal wires of different metals; winding both the mandrel wires, with their fine wire winding, directly side by side around another mandrel; and subsequently chemically attacking and thus removing one of the wound mandrel wires, and also removing the aforesaid other mandrel.

16. A method for electrode fabrication which comprises tautly winding relatively fine tungsten wire on a composite mandrel comprising a pair of longitudinal round wires, one tungsten and the other molybdenum, setting the wound tungsten wire, and subsequently dissolving away the molybdenum mandrel wire.

17. A cathode comprising a relatively small coil of relatively fine wire that is itself coiled into a larger coil, which larger coil is in turn coiled into a still larger coil; a conductor larger than said relatively fine wire extending through the convolutions of one of the two first-mentioned coils, but of smaller cross-sectional area than the internal area of the convolutions through which it extends; and electron-emissive material coating said relatively fine wire and said conductor.

18. A cathode comprising a relatively small coil of relatively fine wire that is itself coiled into a larger coil, which larger coil is in turn coiled into a still larger coil; and a conductor larger than said relatively fine wire extending through its smaller coil convolutions aforementioned, and itself of smaller cross-sectional area than the internal area of said smaller coil convolutions.

19. A cathode comprising relatively fine wire coiled in a series of convolutions each comprising bends of the fine wire connected by straighter portions, the coil of fine wire thus formed being itself coiled into a larger coil; and a conductor larger than said relatively fine wire but smaller than the internal openings of the aforesaid smaller coil convolutions, though of the same order of size as said openings, extending through the smaller coil convolutions and electrically connected to them, and itself coiled in correspondence with the larger convolutions of the smaller coil.

20. A cathode comprising relatively fine wire coiled in a series of convolutions each comprising bends of the fine wire connected by straighter portions, the coil of fine wire thus formed being itself coiled into a larger coil; a conductor larger than said relatively fine wire extending through and conforming to bends of the aforesaid smaller coil convolutions, and electrically connected to them, and itself coiled in correspondence with the larger convolutions of the smaller coil; and electron-emissive activating material coating said relatively fine wire and also in contact with said conductor.

21. A cathode comprising a relatively small oval coil of relatively fine wire that is itself coiled into a larger coil; a conductor larger than said relatively fine wire but smaller than the internal openings of the smaller coil convolutions, though of the same order of size as said openings, coiled in correspondence with the larger convolutions of said smaller coil and extending through the smaller coil convolutions, and electrically connected to them; and electron-emissive activating material coating said relatively fine wire and also in contact with said conductor.

22. A cathode comprising a relatively small oval coil of relatively fine wire that is itself coiled into a larger coil, and a conductor larger than said relatively fine wire extending through and conforming to a bend of the smaller coil convolutions and electrically connected to them, though of smaller cross-sectional area than the internal area of said smaller coil convolutions, and coiled in correspondence with the larger convolutions of said smaller coil.

JOHN O. AICHER.